United States Patent
Johnson

(10) Patent No.: US 8,037,757 B2
(45) Date of Patent: Oct. 18, 2011

(54) PARAMETRIC AMPLIFICATION OF A MEMS GYROSCOPE BY CAPACITANCE MODULATION

(75) Inventor: Burgess R. Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 787 days.

(21) Appl. No.: 12/113,093

(22) Filed: Apr. 30, 2008

(65) Prior Publication Data

US 2009/0320591 A1    Dec. 31, 2009

Related U.S. Application Data

(60) Provisional application No. 61/013,041, filed on Dec. 12, 2007.

(51) Int. Cl.
*G01C 19/56* (2006.01)
(52) U.S. Cl. .................................................. 73/504.12
(58) Field of Classification Search ............. 73/504.12, 73/504.14, 514.32
See application file for complete search history.

(56) References Cited

U.S. PATENT DOCUMENTS

| | | | |
|---|---|---|---|
| 6,257,059 B1 | 7/2001 | Weinberg et al. |
| 6,611,168 B1 | 8/2003 | Denison et al. |
| 6,715,353 B2 | 4/2004 | Johnson |
| 7,036,373 B2 | 5/2006 | Johnson et al. |

OTHER PUBLICATIONS

Scott G. Adams et al., "Independent Tuning of Linear and Nonlinear Stiffness Coefficients," Journal of Microelectromechanical Systems, vol. 7, No. 2, Jun. 1998.*
Oropeza-Ramos et al., Parametric Resonance Amplification in a MEMGyroscope, 2005, pp. 660-663.
Oropeza-Ramos et al., Inherently Robust Micro Gyroscope Actuated by Parametric Resonance, MEMS 2008, Tucson, AZ, Jan. 13-17, 2008, pp. 872-875.

* cited by examiner

Primary Examiner — John Chapman, Jr.
(74) Attorney, Agent, or Firm — Fogg & Powers LLC

(57) ABSTRACT

Parametric amplification of the output of a MEMS gyroscope is achieved by modulating the sense capacitance, or an auxiliary capacitance having an applied DC voltage. The capacitance modulation is produced by the driven motion of the gyroscope mechanism, so the pump signal of the parametric amplifier is not subject to phase errors in the electronics. The capacitance modulation affects the mechanical gain of the sensor (transfer function from input force to sensor mechanism displacement), as well as the electrical gain of the sensor (transfer function from sensor mechanism displacement to output electrical signal). The mechanical and electrical gains of the sensor become phase-dependent, so the Coriolis rate signal can be amplified while the unwanted quadrature-phase signal is attenuated.

18 Claims, 10 Drawing Sheets

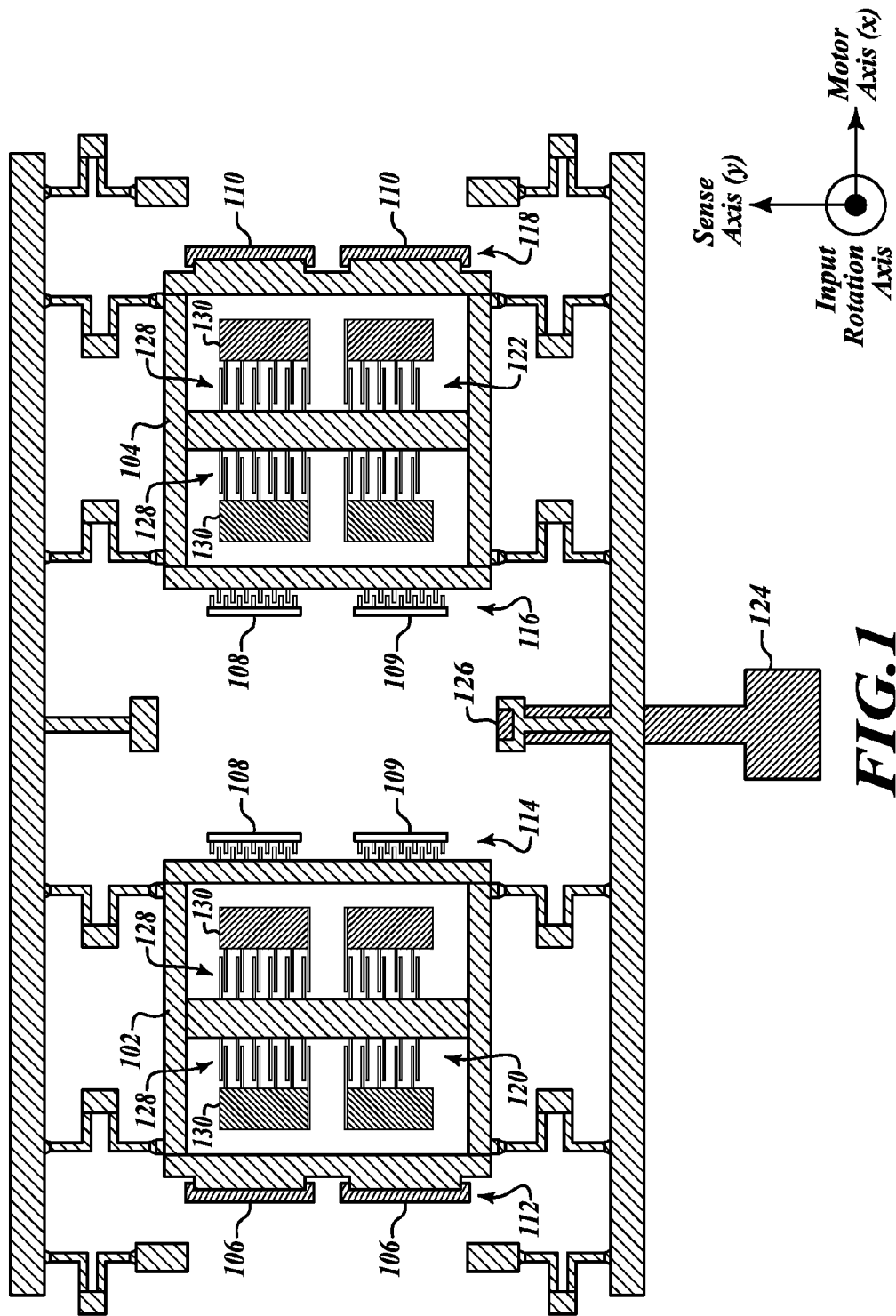

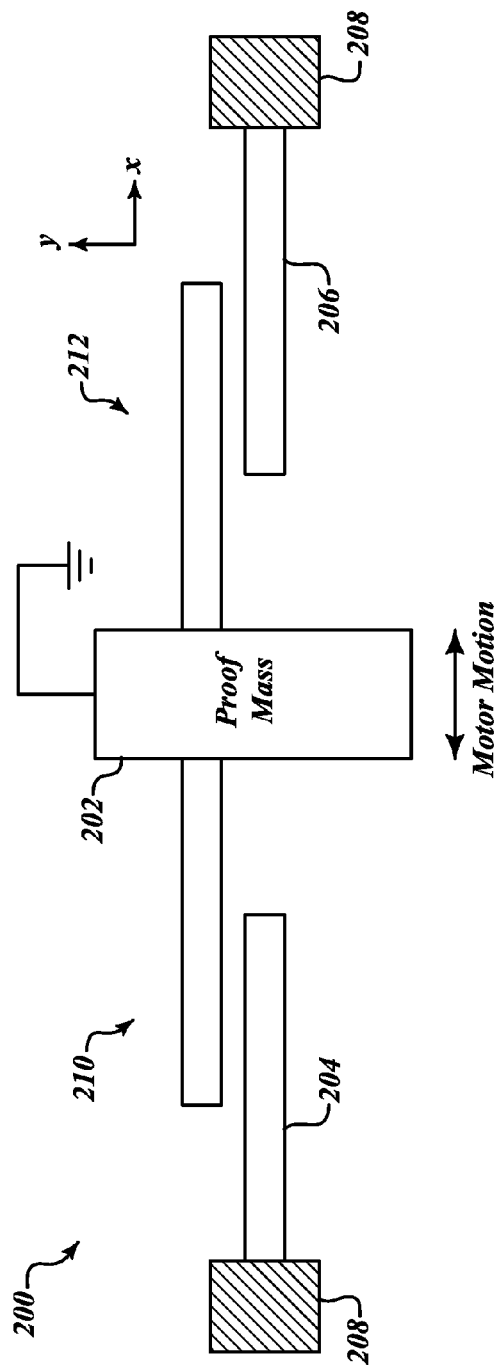
FIG.2 *(PRIOR ART)*
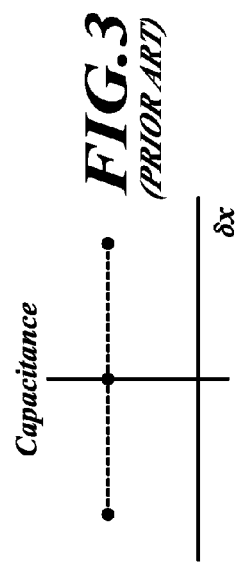
FIG.3 *(PRIOR ART)*

PARAMETRIC AMPLIFICATION OF A MEMS GYROSCOPE BY CAPACITANCE MODULATION

PRIORITY CLAIM

This patent application claims priority from copending U.S. Provisional Patent Application Ser. No. 61/013,041 filed Dec. 12, 2007, and entitled, "Parametric Amplification of a MEMS Gyroscope by Capacitance Modulation," the contents of which are hereby incorporated by reference in its entirety.

GOVERNMENT INTEREST

The present invention was made with support from the United States Government under contract number W15P7T-05-C-P609 and/or W15P7T-07-C-P609 awarded by the United States Army. The United States Government may have certain rights in the invention.

BACKGROUND OF THE INVENTION

A Micro-Electro-Mechanical Systems (MEMS) gyroscope sensor consists of one or more movable proof masses connected to each other and to one or more substrates by flexible suspensions. Typically, the proof masses and suspensions are fabricated by etching heavily doped silicon, and the silicon is bonded to one or more upper and/or lower glass or silicon substrates.

The proof masses are driven electrostatically at the resonant frequency of the "motor" mode. When the sensor experiences rotation, the velocity of the motor mode motion causes the proof masses to experience Coriolis forces perpendicular to the motor velocity and the rotation axis. The proof mass motion produced by the Coriolis force is sensed capacitively, by sense electrodes, to produce an electrical output signal.

In various MEMS gyroscopes, the motor mode consists of the two proof masses moving with equal and opposite velocities parallel to the substrate and along a line connecting the centers of the two proof masses. The motor mode resonant frequency can be in the range of 10 to 20 kHz. MEMS gyroscope sensors may be designed to sense rotation either parallel or perpendicular to the substrate. The Coriolis force drives the "sense" resonant mode of the silicon mechanism, which consists of the two proof masses moving in opposing directions parallel or perpendicular to the substrate, depending on whether the rotation axis is perpendicular or parallel to the substrate. A sensor designed to sense rotation around an axis parallel to the substrate is referred to as an in-plane gyroscope (IPG), and a sensor designed to sense rotation around an axis perpendicular to the substrate is referred to as a z-axis gyroscope or out-of-plane gyroscope (OPG).

In a MEMS gyroscope, the resonant frequency of the sense mode is typically 5% to 10% below the resonant frequency of the motor mode, so the Coriolis force drives the sense mode off-resonance. Other MEMS gyroscopes may operate with the sense resonant frequency as close as possible to the motor resonant frequency, in order to maximize scale factor. However, the bandwidth of such sensors is very limited, and they can have stability issues.

Other MEMS gyroscopes may be quite different from the two-proof mass configuration described above. However, they all have a motor mode driven at its resonant frequency, they all experience a Coriolis force during rotation, and the Coriolis force drives a sense mode whose motion is detected capacitively.

The sensor output signal in MEMS gyroscopes is an AC signal at the motor resonant frequency. Typical MEMS gyroscopes have a large output error signal, designated "quadrature", which is 90 degrees out-of-phase with the output signal produced by the Coriolis force. Phase-sensitive detection allows the Coriolis rate signal to be detected in the presence of a much larger quadrature signal. However, phase shifts in the electronics and in the sensor can cause the quadrature-phase signal to produce errors in the Coriolis-phase signal.

Parametric amplification in a MEMS gyroscope using a pump signal consisting of AC voltages applied to the sense electrodes has been described previously, in U.S. Pat. No. 6,715,353 (Burgess R. Johnson, issued Apr. 6, 2004), which is incorporated by reference in its entirety herein. The AC pump voltages can increase the mechanical gain of the sensor (transfer function from input force to sensor mechanism displacement), as well as the electrical gain of the sensor (transfer function from sensor mechanical displacement to output electrical signal). Also, the mechanical and electrical gains of the sensor become phase-dependent, so that the Coriolis rate signal can be amplified while the unwanted quadrature-phase signal is attenuated.

Oropeza-Ramos, et. al., have described the use of parametric resonance to modify the characteristics of the driven mode of a MEMS gyroscope ("Parametric Resonance Amplification in a MEM Gyroscope," L. A. Oropeza-Ramos and K. L. Turner, Proceedings of the 2005 IEEE Sensors Conference, pages 660-663, Oct. 31-Nov. 3, 2005, Irvine, Calif.), incorporated by reference in its entirety herein.

A difficulty with using AC pump voltages to provide parametric amplification, as described in U.S. Pat. No. 6,715,353, is that the phase of the pump voltages must be precisely synchronized with the phase of the driven motion of the sensor mechanism. If this is not done, the parametric amplification produces a phase shift of the sensor output signal relative to the phase of the input force on the sensor. As a result, the relatively large quadrature-phase force on the sensor mechanism can produce sensor output at the Coriolis rate phase, resulting in a large zero-rate bias error.

BRIEF DESCRIPTION OF THE DRAWINGS

Preferred and alternative embodiments of the present invention are described in detail below with reference to the following drawings:

FIG. 1 illustrates a Micro-Electro-Mechanical Systems (MEMS) capacitance modulation device embodiment;

FIG. 2 illustrates sense electrodes of a conventional MEMS gyroscope having sense capacitance independent of time;

FIG. 3 illustrates capacitance as a function of motor displacement distance ($\delta x$) of the prior art MEMS gyroscope of FIG. 2;

DETAILED DESCRIPTION OF THE PREFERRED EMBODIMENT

Figure 4:
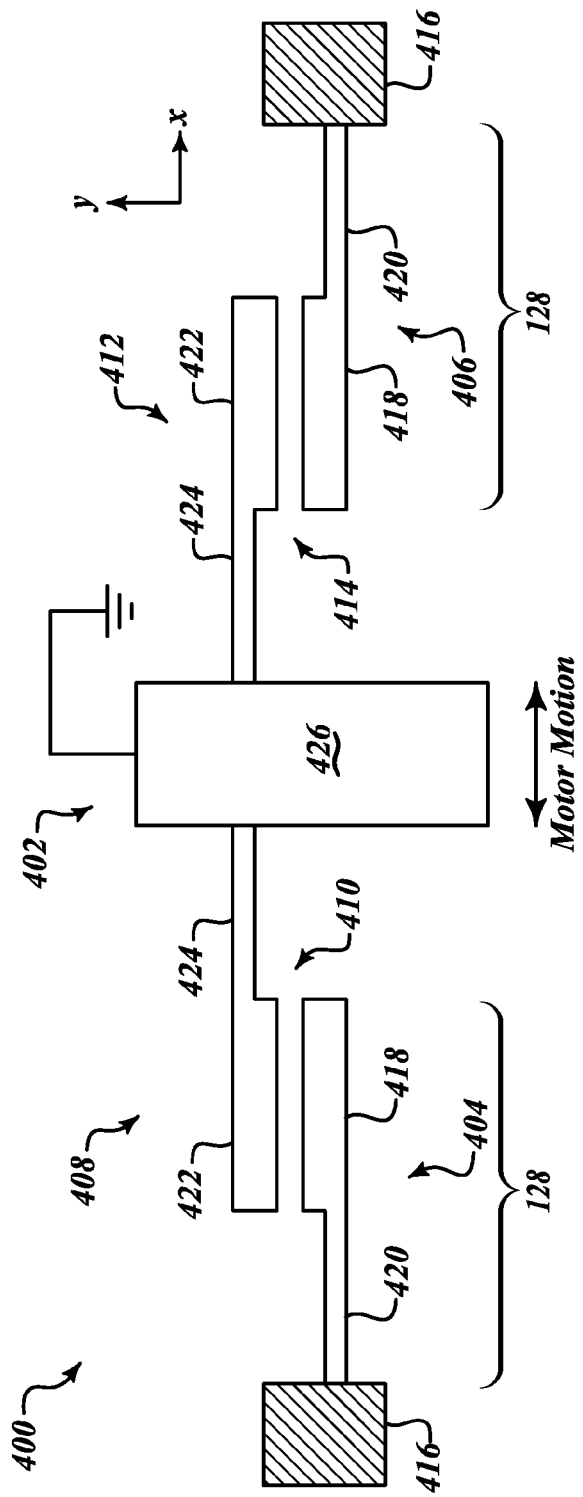
FIGS. 4, 6, 8, 10, and 12 illustrate gaps between the electrodes that vary with motor displacement.

FIG. 1 illustrates an exemplary Micro-Electro-Mechanical Systems (MEMS) capacitance modulation device 100. The exemplary embodiment of the MEMS capacitance modulation device 100 has a first vibrating mass 102, a second vibrating mass 104, one or more left motors 106, a top center motor pickoff 108, a bottom center motor pickoff 109, one or more right motors 110, a left comb structure 112, a first center comb structure 114, a second center comb structure 116, a right comb structure 118, left sense electrodes 120, right sense electrodes 122, and an output electrode 124 coupled to one or more anchor points 126.

The left motor 106 is capacitively coupled to the first vibrating mass 102 via the left comb structure 112. The right motor 110 is capacitively coupled to the second vibrating mass 104 via the right comb structure 118. The center motor pickoffs 108, 109 are capacitively coupled to the first vibrating mass 102 via the first center comb structure 114. The center motor pickoffs 108, 109 are capacitively coupled to the second vibrating mass 104 via the second center comb structure 116. The left motor 106 and the right motor 110 are driven with signals to impart a vibrating motion at a known frequency to the first vibrating mass 102 and the second vibrating mass 104, hereinafter referred to as the motor frequency. The center motor pickoffs 108, 109 are biased with DC voltages, so that motion of the proof masses along the x-axis produces AC electrical currents which are input to electronics controlling the signals applied to the motor combs.

The sense electrodes 120, 122 are capacitively coupled to the first and second vibrating masses 102, 104, respectively, by a plurality of comb finger pairs 128. Each comb finger pair 128 has one comb finger attached to the vibrating mass and another comb finger attached to a sense electrode. Sense electrodes 120, 122 are coupled to anchors 130. In the exemplary embodiment, comb finger pairs 128 are separated from other comb finger pairs by a predefined distance. Further, in some embodiments of the sense electrodes 120, 122, the comb finger pairs are arranged so that each pair has a corresponding pair such that the two pairs have mirror symmetry about the motor axis shown in FIG. 1. Other configurations for comb structures may be used in alternative embodiments of the MEMS capacitance modulation device 100.

Embodiments of the MEMS capacitance modulation device 100 employ various configurations in the structure of the comb finger pairs 128, as described in greater detail below. The structures of the comb finger pairs allow the capacitance of a comb finger pair 128 to vary with the displacement of the vibrating mass along the motor axis.

Embodiments of the MEMS capacitance modulation device 100 produce parametric amplification with the phase of the pump force precisely synchronized with the phase of the motor motion of the sensor mechanism. In some embodiments, this is achieved by designing the sense electrodes 120, 122 so that motor motion produces a modulation of the sense capacitance at twice the motor frequency, resulting in a parametric pump force at twice the motor frequency, due to modulation of the electrostatic force on the sense mode. The phase of the parametric pump force is precisely synchronized with the motor motion of the proof masses, because the parametric pump force is produced by the motor motion of the proof masses.

The time-dependent electrostatic force $F_y$ along the y-axis produced by a capacitance C that is a function of time and of y-axis displacement (e.g., sense mode displacement) is given by equation (1):

$$F_y(t) = \frac{1}{2} \frac{\partial C(t)}{\partial y} V_{bias}^2, \quad (1)$$

where $V_{bias}$ is the voltage on the capacitor electrodes, and dC/dy is the derivative of C with respect to y. Modulating dC/dy at twice the motor frequency causes the force $F_y$ to be modulated at twice the motor frequency, when $V_{bias}$ is a DC voltage. Thus, $F_y(t)$ can be a pump force which provides parametric amplification of the mechanical response of the proof masses to an input force (e.g., Coriolis force). Alternatively, or additionally, $F_y(t)$ can be a pump force which provides suppression of the response to the quadrature-phase force. The amplified mechanical response is produced in a manner similar to that described in U.S. Pat. No. 6,715,353, except that the pump force in the present invention is produced by modulation of the sense capacitance. The pump force described in U.S. Pat. No. 6,715,353 was produced by applying AC voltage to the sense capacitance, so that Vbias$^2$ is modulated at twice the motor frequency, with dC/dy independent of time.

FIG. 2 illustrates an assembly 200 containing two pairs of sense comb fingers that are part of a conventional prior art MEMS gyroscope, with one member of each pair being attached to vibrating proof mass 202. The total capacitance of the two comb finger pairs is independent of the displacement distance of the vibrating mass 202 along the x-axis. The assembly 200 has a proof mass 202, a left sense electrode comb finger 204, and a right sense electrode comb finger 206. The left sense electrode comb finger 204 and the right sense electrode comb finger 206 are attached to their respective sense electrodes 208. The sense electrodes 208 are secured to anchors attached to the substrate (not shown). Further, the left sense electrode comb finger 204 and the right sense electrode comb finger 206 are capacitively coupled to the comb fingers 210, 212, respectively, of the proof mass 202. A motor motion induced to the proof mass 202 along the x-axis does not cause a variance in the capacitance between the sense electrodes comb fingers 204, 206 and the comb fingers 210, 212 of the proof mass 202.

FIG. 3 illustrates capacitance as a function of motor displacement distance ($\delta x$) of the prior art assembly 200. The proof mass motor motion is along the x-axis. Motor motion produces equal and opposite changes in the left and right capacitances of the sense electrodes comb fingers 204, 206 and the comb fingers 210, 212. Accordingly, the total capacitance is independent of motor motion.

FIG. 4 illustrates an assembly 400 containing two instances of an exemplary embodiment of a sense comb finger pair 128 that provides modulation of the sense capacitance. Assembly 400 may be part of a MEMS gyroscope. The assembly 400 has a proof mass 402, a left sense electrode comb finger 404 and a right sense electrode comb finger 406. The proof mass 402 has a left proof mass comb finger 408 that provides capacitive coupling to the corresponding sense electrode comb finger 404 at gap 410. The proof mass 402 has a right proof mass comb finger 412 that provides capacitive coupling to the corresponding sense electrode comb finger 406 at gap 414. The sense electrode comb fingers 404 and 406 are attached to their respective sense electrodes 416. The sense electrodes 416 are secured to anchors attached to the substrate (not shown).

The sense electrode comb fingers 404, 406 are defined by an end portion 418 and an attaching portion 420 which secures them to their respective sense electrodes 416. The proof mass comb fingers 408, 412 are defined by an end portion 422 and an attaching portion 424 which secures the proof mass comb fingers 408, 412 to the proof mass body 426.

The separation between the proof mass comb fingers 408, 412 and the sense electrode comb fingers 404, 406, respectively, defines the gaps 410, 414. The gaps 410, 414 define the capacitive coupling (capacitance) between the sense electrode comb fingers 404, 406 and the proof mass comb fingers 408, 412.

In FIG. 4, the comb finger end portion 418 has a width that is greater than the width of the comb finger attaching portion 420. Optionally, the proof mass comb fingers 408, 412 have an end portion 422 that is wider than a portion 424 attached to the body 426 of the proof mass 402. (In yet another embodiment, the comb finger portions 418 and 420 are the same width while the comb finger end portion 422 is wider than the comb finger portion 424.) The differences in the width of the comb finger portions 418 and 420, and/or the comb finger portions 422 and 424, causes a change in the gaps 410, 414 as the motor motion is induced to the proof mass 402. In an exemplary embodiment, the sense electrode comb fingers 404, 406 have capacitance modulated at twice the motor frequency.

Figure 5:
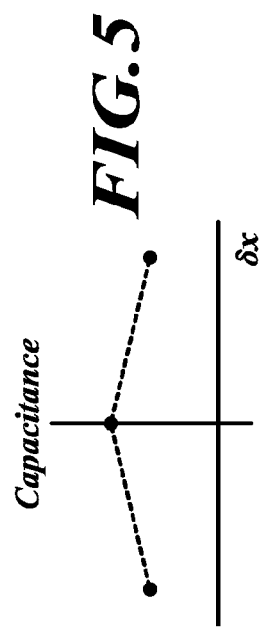
FIGS. 5, 7, 9, 11, and 13 illustrate capacitance as a function of motor displacement distance ($\delta x$) of the embodiments illustrated in FIGS. 4, 6, 8, 10, and 12, respectively.

A motor motion induced to the proof mass 402, resulting in a motor displacement distance (δx) along the illustrated x-axis, causes a detectable variance in the capacitance between the sense electrodes 416 and the proof mass 402 as the gaps 410, 414 change. The derivative of said capacitance with respect to displacement along the illustrated y-axis also changes with motor displacement δx. As a result, when a DC bias voltage is applied between the sense electrodes 416 and the proof mass 402, the electrostatic force along the illustrated y-axis, given by equation 1, varies with x-axis displacement of the proof mass. The capacitance is configured to decrease with positive and negative motor displacement distance (δx), in accordance with FIG. 5. For positive δx, the average gap separation between comb fingers 406 and 412 increases, relative to δx=0, and the average gap separation between comb fingers 404 and 408 is constant. Thus, the total capacitance decreases relative to its value when δx=0. Because of the mirror symmetry of the assembly 400, negative values of δx also produce a decrease in capacitance.

Figure 6:
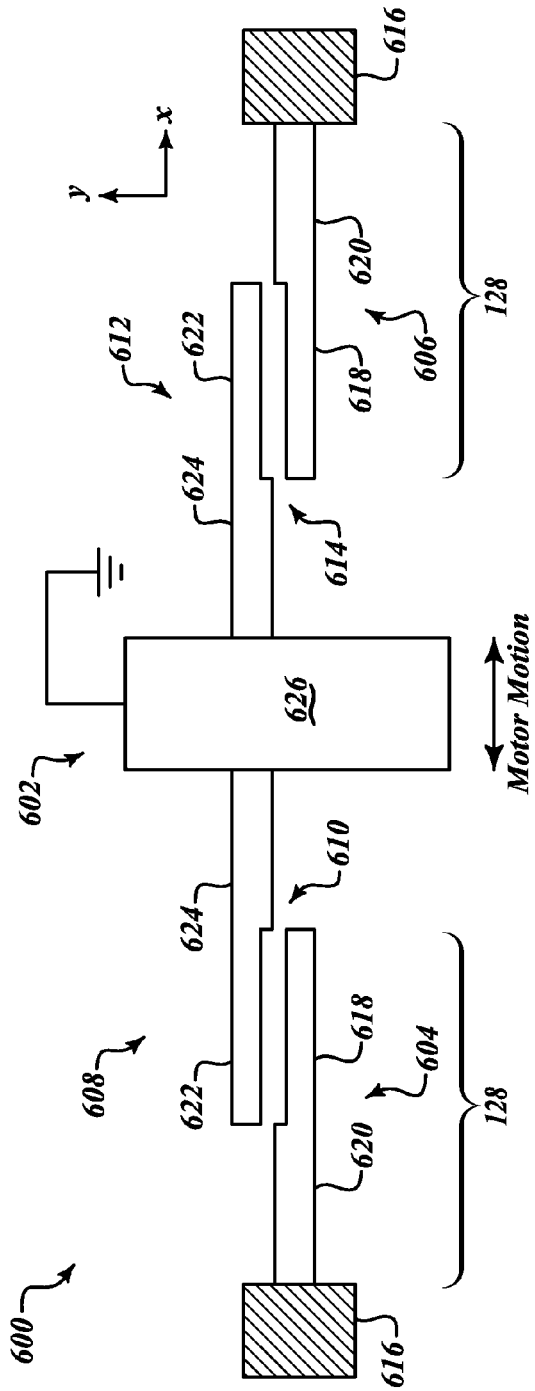

FIG. 6 illustrates an assembly 600 containing two instances of an exemplary embodiment of a sense comb finger pair 128 that provides modulation of the sense capacitance. Assembly 600 may be part of a MEMS gyroscope. The assembly 600 has a proof mass 602, a left sense electrode comb finger 604 and a right sense electrode comb finger 606. The proof mass 602 has a left comb finger 608 that provides capacitive coupling to the left sense electrode comb finger 604 at gap 610. The proof mass 602 has a right comb finger 612 that provides capacitive coupling to the right sense electrode comb finger 606 at gap 614. The sense electrode comb fingers 604 and 606 are attached to their respective sense electrodes 616. The sense electrodes 616 are secured to anchors attached to the substrate (not shown).

The sense electrode comb fingers 604, 606 are defined by an end portion 618 and an attaching portion 620 which secures the sense electrode comb fingers 604, 606 to their respective sense electrodes 616. The proof mass comb fingers 608, 612 are defined by an end portion 622 and an attaching portion 624 which secures the proof mass comb fingers 608, 612 to the proof mass body 626.

The separation between the proof mass comb fingers 608, 612 and the sense electrode comb fingers 604, 606, respectively, defines the gaps 610, 614. The gaps 610, 614 define the capacitive coupling (capacitance) between the sense electrode comb fingers 604, 606 and the proof mass comb fingers 608, 612.

Figure 7:
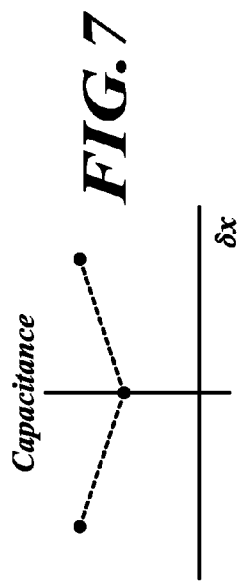

In FIG. 6, the width of end portion 618 is smaller than the width of portion 620. Optionally, the proof mass comb fingers 608, 612 have an end portion 622 with a width that is less than the width of a portion 624 attached to the body 626 of the proof mass 602. (In yet another embodiment, the portions 618 and 620 are the same width while the end portion 622 has a width less than the portion 624.) The differences in the widths of the portions 618 and 620, and/or the portions 622 and 624, cause a change in the capacitance of the gaps 610, 614 as the motor motion is induced to the proof mass 602. In an exemplary embodiment, the comb fingers 604, 606 have capacitance modulated at twice the motor frequency. Accordingly, capacitance increases with motor displacement. The capacitance is illustrated as a function of motor displacement in FIG. 7.

A motor motion induced to the proof mass 602, resulting in a motor displacement distance (δx) along the illustrated x-axis, causes a detectable variance in the capacitance between the sense electrodes 616 and the proof mass 602 as the gaps 610, 614 change. The derivative of said capacitance with respect to displacement along the illustrated y-axis also changes with motor displacement δx. As a result, when a DC bias voltage is applied between the sense electrodes 616 and the proof mass 602, the electrostatic force along the illustrated y-axis, given by equation 1, varies with x-axis displacement of the proof mass. The capacitance is configured to increase with positive and negative motor displacement distance (δx), in accordance with FIG. 7. For positive δx, the average gap separation between comb fingers 606 and 612 decreases, relative to δx=0, and the average gap separation between comb fingers 604 and 608 is constant. Thus, the total capacitance increases relative to its value when δx=0. Because of the mirror symmetry of the assembly 600, negative values of δx also produce an increase in capacitance.

Figure 8:
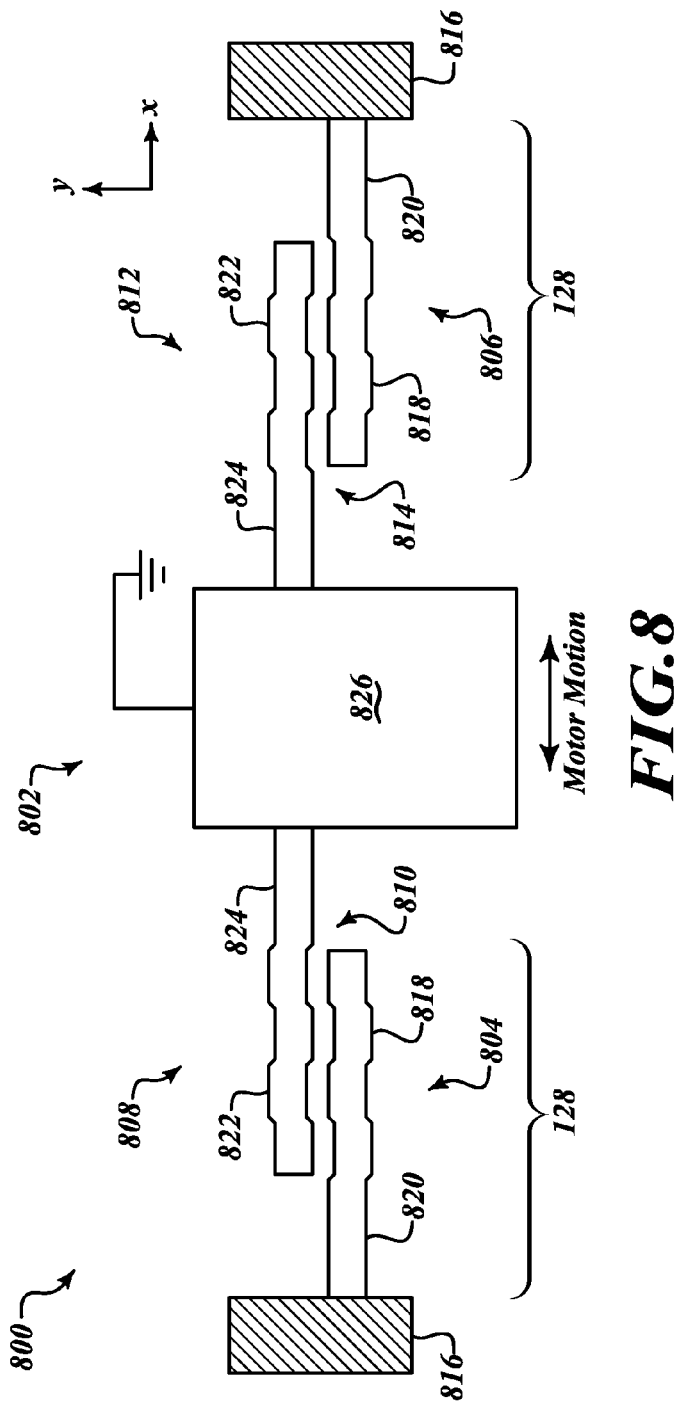

FIG. 8 illustrates an assembly 800 containing two instances of an exemplary embodiment of a sense comb finger pair 128 that provides modulation of the sense capacitance. Assembly 800 may be part of a MEMS gyroscope. The assembly 800 has a proof mass 802, a left sense electrode comb finger 804 and a right sense electrode comb finger 806. The proof mass 802 has a left comb finger 808 that provides capacitive coupling to the left sense electrode comb finger 804 at gap 810. The proof mass 802 has a right comb finger 812 that provides capacitive coupling to the right sense electrode comb finger 806 at gap 814. The sense electrode comb fingers 804 and 806 are attached to their respective sense electrodes 816. The sense electrodes 816 are secured to anchors attached to the substrate (not shown).

The sense electrode comb fingers 804, 806 are defined by an end portion 818 and an attaching portion 820 which secures the sense electrode comb fingers 804, 806 to their respective sense electrodes 816. The proof mass comb fingers 808, 812 are defined by an end portion 822 and an attaching portion 824 which secures the proof mass comb fingers 808, 812 to the proof mass body 826. The separation between the proof mass comb fingers 808, 812 and the comb fingers 804, 806, respectively, defines the gaps 810, 814. The gaps 810, 814 define the capacitive coupling (capacitance) between the sense electrode comb fingers 804, 806 and the proof mass comb fingers 808, 812.

Figure 9:
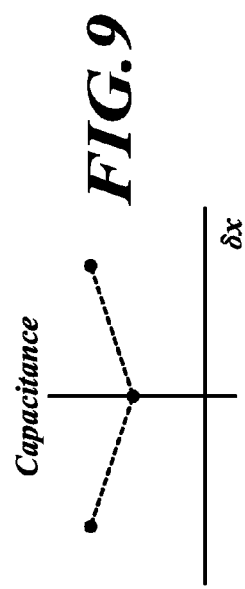

In FIG. 8, the sense electrode comb fingers 804, 806 have a corrugated end portion 818 and a non-corrugated attaching portion 820. Optionally, the proof mass comb fingers 808, 812 have an end portion 822 that is corrugated and a non-corrugated attaching portion 824. (In yet another embodiment, the end portions 822 are corrugated while the portions 818 are non-corrugated.) The corrugation of the portion 818, and/or the portions 822, cause a change in the capacitance gaps 810, 814 as the motor motion is induced to the proof mass 802. In an exemplary embodiment, the sense electrodes 816 have capacitance modulated at twice the motor frequency. Accordingly, capacitance increases with motor displacement. The capacitance is illustrated as a function of motor displacement in FIG. 9.

A motor motion induced to the proof mass 802, resulting in a motor displacement distance (δx) along the illustrated directions (x-axis), causes a detectable variance in the capacitance between the sense electrodes 816 and the proof mass 802 as the gaps 810, 814 change. The derivative of the capacitance with respect to displacement along the illustrated y-axis also changes with motor displacement δx. As a result, when a DC bias voltage is applied between the sense electrodes 816 and the proof mass 802, the electrostatic force along the illustrated y-axis, given by equation 1, varies with x-axis displacement of the proof mass. The capacitance is configured to increase with positive and negative motor displacement distance (δx), in accordance with FIG. 9. For positive and negative δx, the average of the inverse of the gap separations in gaps 810, 814 increases, relative to δx=0. Thus, the total capacitance increases relative to its value when δx=0. Because of the mirror symmetry of the assembly 800, negative values of δx produce the same increase in capacitance as positive values of δx.

Figure 10:
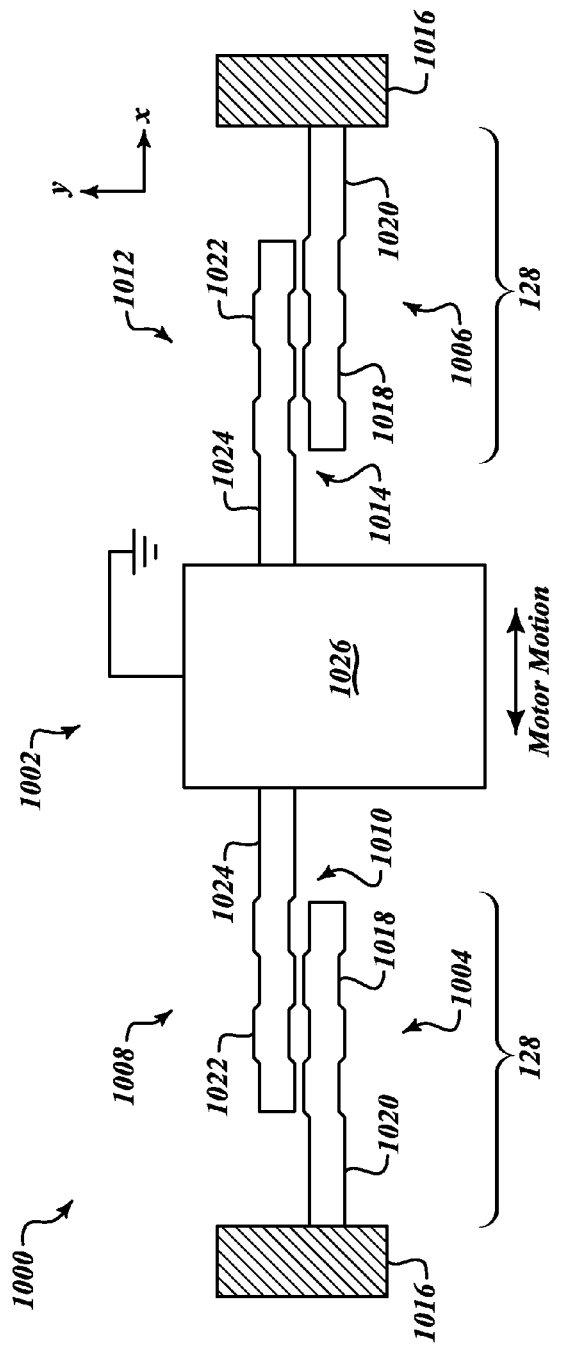

FIG. 10 illustrates an assembly 1000 containing two instances of an exemplary embodiment of a sense comb finger pair 128 that provides modulation of the sense capacitance. Assembly 1000 may be part of a MEMS gyroscope. The assembly 1000 has a proof mass 1002, a left sense electrode comb finger 1004 and a right sense electrode comb finger 1006. The proof mass 1002 has a left comb finger 1008 that provides capacitive coupling to the left sense electrode comb finger 1004 at gap 1010. The proof mass 1002 has a right comb finger 1012 that provides capacitive coupling to the right sense electrode comb finger 1006 at gap 1014. The sense electrode comb fingers 1004 and 1006 are attached to their respective sense electrodes 1016. The sense electrodes 1016 are secured to anchors attached to the substrate (not shown).

The sense electrode comb fingers 1004, 1006 are defined by an end portion 1018 and an attaching portion 1020 which secures the sense electrode comb fingers 1004, 1006 to their respective sense electrodes 1016. The proof mass comb fingers 1008, 1012 are defined by an end portion 1022 and an attaching portion 1024 which secures the proof mass comb fingers 1008, 1012 to the proof mass body 1026. The separation between the proof mass comb fingers 1008, 1012 and the comb fingers 1004, 1006, respectively, defines the gaps 1010, 1014. The gaps 1010, 1014 define the capacitive coupling (capacitance) between the sense electrode comb fingers 1004, 1006 and the proof mass comb fingers 1008, 1012.

In FIG. 10, the sense electrode comb fingers 1004, 1006 have a corrugated end portion 1018 and a non-corrugated attaching portion 1020. In this embodiment, the corrugations of comb finger 1004 oppose the corrugations of comb finger 1008, and the corrugations of comb finger 1006 oppose the corrugations of comb finger 1012.

The corrugation of the portions 1018 and the portions 1022 cause a change in the capacitance gaps 1010, 1014 as the motor motion is induced to the proof mass 1002. In an exemplary embodiment, the sense electrodes 1016 have capacitance modulated at twice the motor frequency. Accordingly, capacitance decreases with motor displacement. The capacitance is illustrated as a function of motor displacement in FIG. 11.

A motor motion induced to the proof mass 1002, resulting in a motor displacement distance (δx) along the illustrated directions (x-axis), causes a detectable variance in the capacitance between the sense electrodes 1016 and the proof mass 1002 as the gaps 1010, 1014 change. The derivative of said capacitance with respect to displacement along the illustrated y-axis also changes with motor displacement δx. As a result, when a DC bias voltage is applied between the sense electrodes 1016 and the proof mass 1002, the electrostatic force along the illustrated y-axis, given by equation 1, varies with x-axis displacement of the proof mass. The capacitance is configured to decrease with positive and negative motor displacement distance (δx), in accordance with FIG. 11. For positive and negative δx, the average of the inverse of the gap separations in gaps 1010, 1014 decreases, relative to δx=0. Thus, the total capacitance decreases relative to its value when δx=0. Because of the mirror symmetry of the assembly 1000, negative values of δx produce the same decrease in capacitance as positive values of δx.

Figure 12:
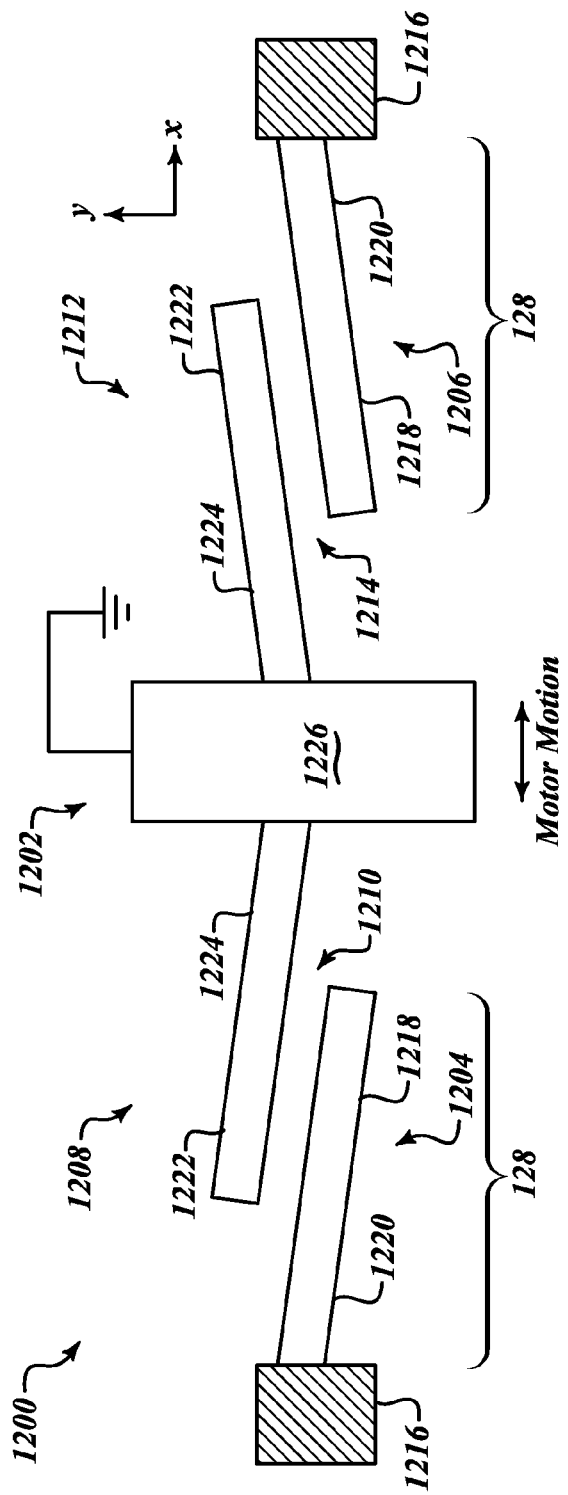

FIG. 12 illustrates an assembly 1200 containing two instances of an exemplary embodiment of a sense comb finger pair 128 that provides modulation of the sense capacitance. Assembly 1200 may be part of a MEMS gyroscope. The assembly 1200 has a proof mass 1202, a left sense electrode comb finger 1204 and a right sense electrode comb finger 1206. The proof mass 1202 has a left comb finger 1208 that provides capacitive coupling to the left sense electrode comb finger 1204 at gap 1210. The proof mass 1202 has a right comb finger 1212 that provides capacitive coupling to the right sense electrode comb finger 1206 at gap 1214. The sense electrode comb fingers 1204 and 1206 are attached to their respective sense electrodes 1216. The sense electrodes 1216 are secured to anchors attached to the substrate (not shown).

The sense electrode comb fingers 1204, 1206 are defined by an end portion 1218 and an attaching portion 1220 which secures the sense electrode comb fingers 1204, 1206 to their respective sense electrodes 1216. The proof mass comb fingers 1208, 1212 are defined by an end portion 1222 and an attaching portion 1224 which secures the proof mass comb fingers 1208, 1212 to the proof mass body 1226.

The separation between the proof mass comb fingers 1208, 1212 and the sense electrode comb fingers 1204, 1206, respectively, defines the gaps 1210, 1214. The gaps 1210, 1214 define the capacitive coupling (capacitance) between the sense electrode comb fingers 1204, 1206 and the proof mass comb fingers 1208, 1212.

Figure 11:
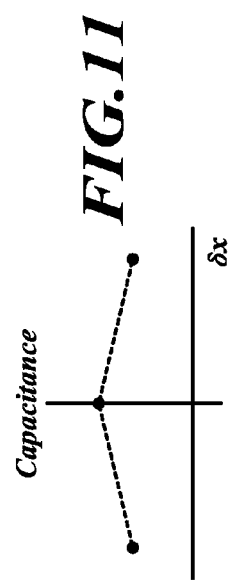

FIG. 12 illustrates that x-axis motion of the sense electrode comb fingers 1204, 1206 provides modulation of the capacitance gaps 1210, 1214. The sense electrode comb fingers 1204, 1206 and the proof mass comb fingers 1208, 1212 are tilted at a shallow angle with respect to the x-axis, so that motor motion of the proof mass 1202 along the x-axis causes the capacitance gaps 1210, 1214 to increase on one side of the proof mass 1202 and decrease on the other side in a non-linear fashion. Since the capacitance is inversely proportional to the gap, the total capacitance is increased by the x-axis displacement. In an exemplary embodiment, the non-linear dependence of capacitance on the gaps 1210, 1214 causes the tilted sense electrodes to provide capacitance modulation with an approximately parabolic dependence of capacitance on motor displacement, as illustrated in FIG. 11.

Figure 13:
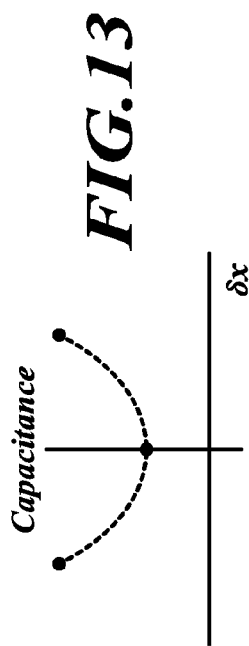

In FIG. 13, capacitance is illustrated as a function of motor displacement, for the assembly of FIG. 12. The capacitance is a non-linear function of the motor displacement distance (δx) along the illustrated x-axis. The derivative of said capacitance with respect to displacement along the illustrated y-axis also changes with motor displacement δx. As a result, when a DC bias voltage is applied between the sense electrodes 1216 and the proof mass 1202, the electrostatic force along the illustrated y-axis, given by equation 1, varies with x-axis displacement of the proof mass.

The non-linear capacitance as a function of x-axis displacement of the proof mass 1202 in assembly 1200 may provide more effective parametric amplification than the electrodes of the assemblies shown in FIGS. 4, 6, and/or 8, since the frequency component of the capacitance modulation at twice the motor frequency is larger when the capacitance is an approximately parabolic function of motor displacement than when it is proportional to the absolute value of motor displacement, for equal amplitudes of oscillatory motor displacement. However, the configurations of FIGS. 4, 6, and/or 8 may be preferable for some situations, because the tilted electrodes illustrated in FIG. 12 may be impractical and/or difficult to make when the comb fingers are very long.

The modulation of capacitance produced by the mating comb fingers of the comb finger pairs 128 illustrated in FIGS. 4, 6, 8, 10 and/or 12 also produces modulation of the first and second derivatives of capacitance with respect to displacement along the y-axis. The modulation of these derivatives is the origin of the parametric amplification effects that are the subject of the various embodiments.

Modulating the sense capacitance affects the MEMS gyro sensor's mechanical gain (transfer function between input force and proof mass displacement) as well as its electrical gain (transfer function between proof mass displacement and electrical output signal). The effect on mechanical gain is described hereinbelow.

Figure 14A:
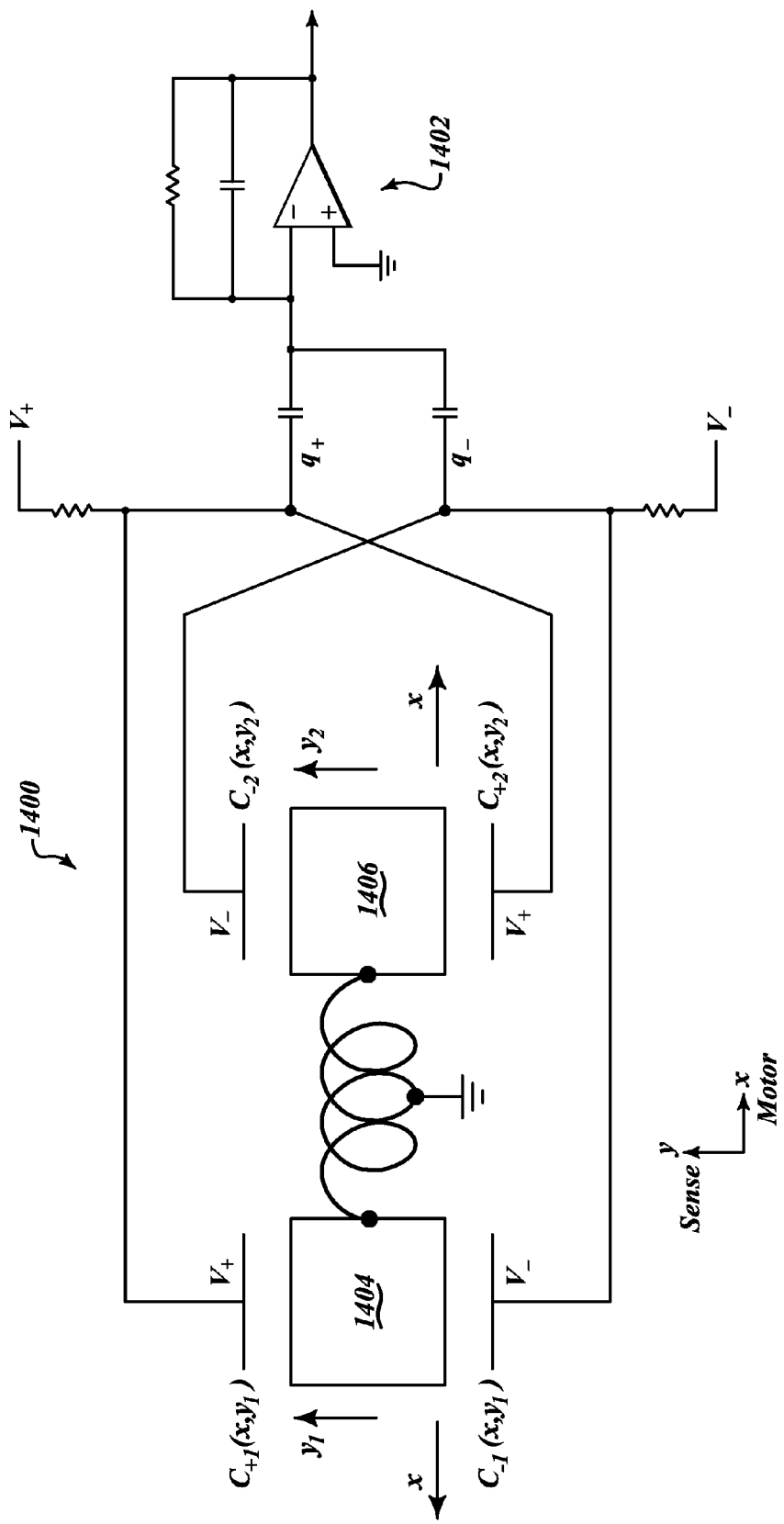
FIGS. 14a, 14b, and 14c illustrate a MEMS gyroscope sensor with four sense capacitances.
Figure 14B:
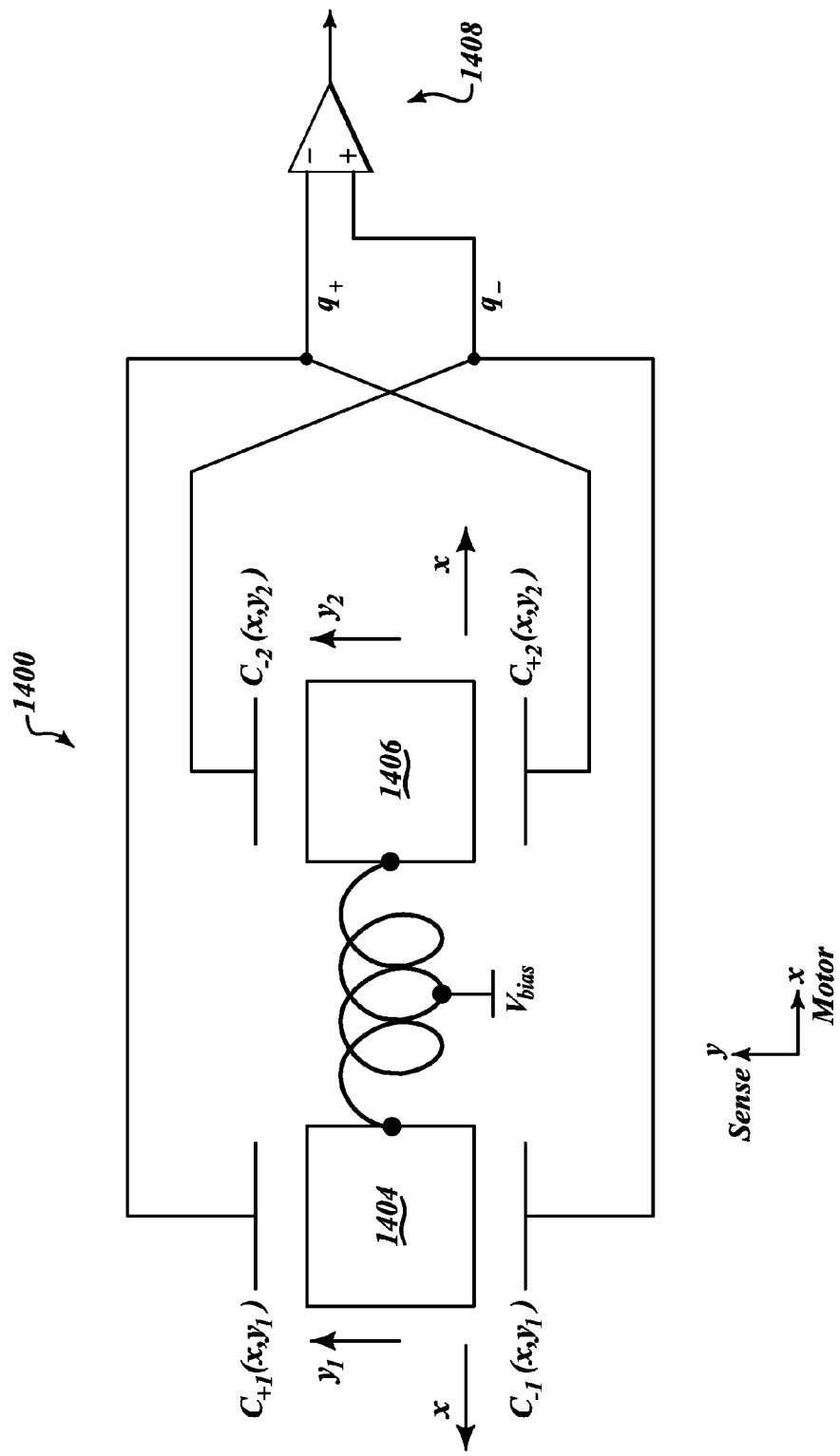
Figure 14C:
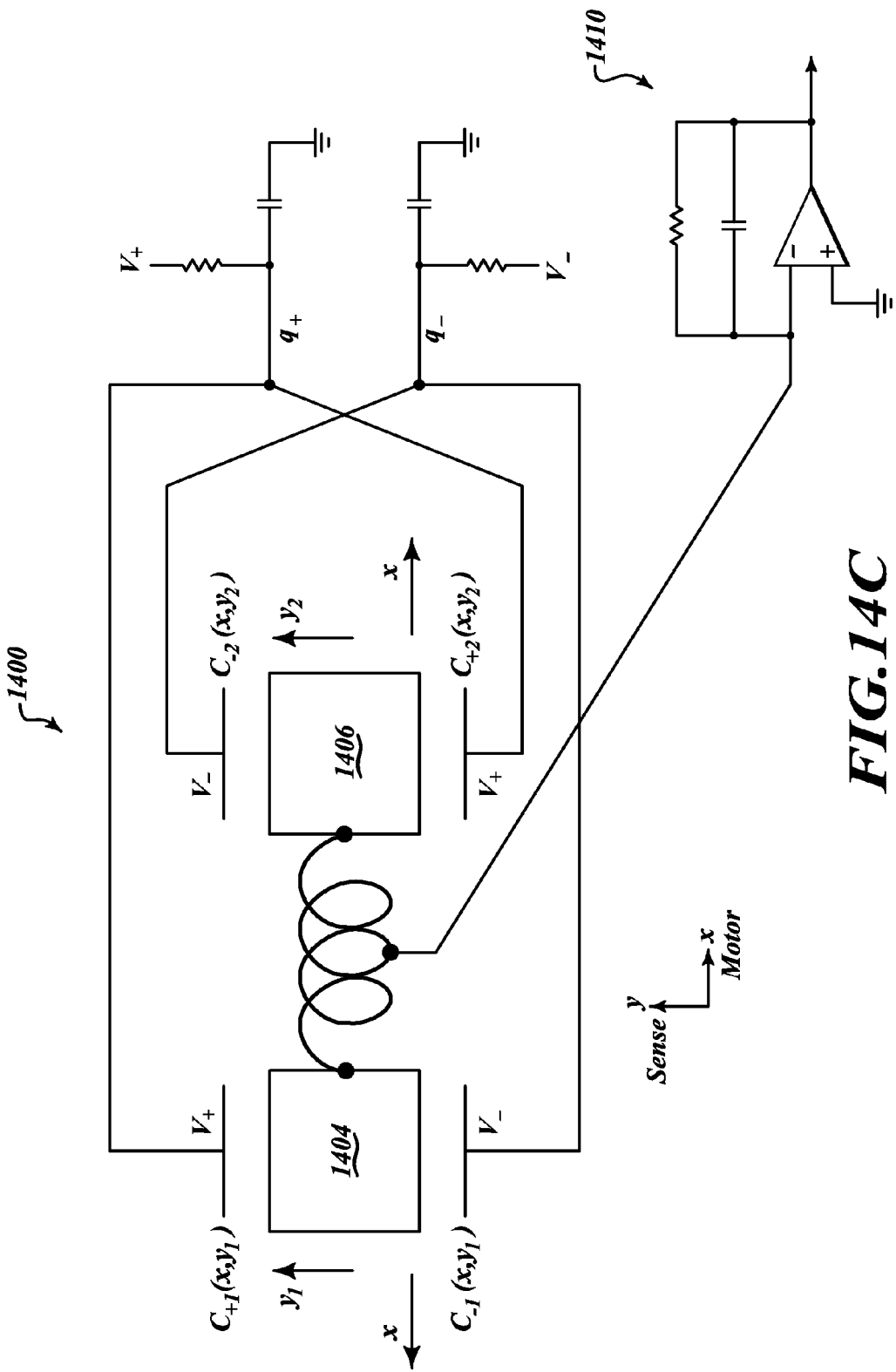

FIGS. 14a, 14b, and 14c show various embodiments of a MEMS gyroscope 1400 with four sense capacitances $C_{+1}(x, y_1)$, $C_{-1}(x,y_1)$, $C_{+2}(x,y_2)$, and $C_{-2}(x,y_2)$, which may be modulated at twice the motor frequency in an exemplary embodiment. For clarity, FIGS. 14a, 14b, and 14c do not show the detailed capacitor shape necessary for the modulation. FIGS. 14a, 14b, and 14c show three methods of applying sense bias voltage to MEMS gyroscope 1400, and the corresponding methods for connecting a charge amplifier in order to produce an output voltage proportional to the rotation rate.

FIG. 14a illustrates two polarities of sense bias voltage on the sense plates, and a single-ended charge amplifier 1402 whose input is AC-coupled to the sense plates. The sense capacitances are biased with DC bias voltages $V_+$ (positive) and $V_-$ (negative), which in some embodiments may be of equal magnitude and opposite polarity. FIG. 14b illustrates a single polarity of sense bias voltage, $V_{bias}$, on the proof masses 1404, 1406, and a differential charge amplifier 1408 whose inputs are DC-coupled to the sense plates. The differential charge amplifier 1408 is typically constructed such that its inputs are maintained at virtual ground. As a result, the voltage on the sense plates is maintained at virtual ground. FIG. 14c illustrates two polarities of sense bias voltage on the sense plates, and a single-ended charge amplifier 1410 whose input is DC-coupled to the proof masses. The sense capacitances are biased with DC bias voltages $V_+$ (positive) and $V_-$ (negative), which in some embodiments may be of equal magnitude and opposite polarity.

The x-axis displacements of the two proof masses 1404, 1406 have the same magnitude (labeled as "x" in FIGS. 14a, 14b, and 14c), but opposite directions. Rotation about an axis orthogonal to the motor axis (x axis) and the sense axis (y axis) produces Coriolis forces on the proof masses along the sense axis. The resulting proof mass displacements change the four sense capacitances, producing time-varying charges $q_+(t)$ and $q_-(t)$ on the sense capacitances, which are inputs to the charge amplifiers shown in FIG. 14a, 14b, or 14c.

The outputs of the sensor/charge amplifier combined systems shown in FIGS. 14a, 14b, and 14c are designed to be sensitive only to the differential sense-axis motion produced by the Coriolis forces. Equation (2) describes the differential motion for this embodiment:

$$\ddot{y}_S + \frac{\gamma}{m}\dot{y}_S + \omega_{SM}^2 y_S = \frac{V^2}{4m}\left[\frac{d}{dy_1}(C_{+1}(x, y_1) + C_{-1}(x, y_1)) - \frac{d}{dy_2}(C_{+2}(x, y_2) + C_{-1}(x, y_2))\right] + \frac{F(t)}{m} \quad (2)$$

where the sense-axis differential motion of proof masses 1404, 1406, $y_S(t)$, referred to as sense mode motion, is defined by equation (3) as:

$$y_S(t) \equiv \frac{(y_1 - y_2)}{2}. \quad (3)$$

The first and second time derivatives of $y_S(t)$ are $\dot{y}_S$ and $\ddot{y}_S$, and the differential Coriolis-phase and quadrature-phase forces is defined by equation (4) as:

$$F(t) \equiv \frac{F_1(t) - F_2(t)}{2} = F_0 \cos(\omega t + \psi), \quad (4)$$

where $\omega$ is the driven frequency of motor motion along the x-axis, and $\psi$ is a phase factor. The phase of the driven motor motion is defined by equation (5) as:

$$x(t) = x_0 \sin(\omega t). \quad (5)$$

Other variables in equation (2) are defined as follows:

m is the mass of each proof mass, $\gamma$ is the damping parameter for the sense mode, $\omega_{SM}$ is the mechanical resonant frequency of the sense mode (resonant frequency when no voltages are applied), and V is the magnitude of $V_+$ and $V_-$ (magnitudes are assumed identical) in the embodiments of FIGS. 14a and 14c, or the magnitude of $V_{bias}$ in the embodiment of FIG. 14b.

The first term on the right hand side of equation (2) is the differential electrostatic force produced by the sense capacitances. The displacements $y_1(t)$ and $y_2(t)$ are typically small. Therefore, it is useful to expand the capacitances in Taylor series in $y_1(t)$ and $y_2(t)$, and ignore terms beyond second order. Assuming all four sense capacitances are identical when x, $y_1$ and $y_2$ are zero, equation (2) becomes equation (6) as follows:

$$\ddot{y}_S + \frac{\gamma}{m}\dot{y}_S + \left(\omega_{SM}^2 - \frac{C''_{+1}(x, 0)V^2}{m}\right)y_S = \frac{F}{m}, \quad (6)$$

where $C''_{+1}(x,0)$ is the second derivative of $C_{+1}(x, y_1)$ with respect to $y_1$, evaluated at $y_1=0$.

The motor motion modulates $C''_{+1}(x,0)$ as a function of time. The modulation can be expressed as a Fourier series consisting of harmonics of twice the motor frequency $\omega$, as defined by equation (7):

$$C''_{+1}(x(t), 0) = C''_{+1}(0, 0) + \alpha''_0 + \sum_{n=1}^{\infty} \alpha''_n \cos(2n\omega t), \quad (7)$$

where $\alpha_0''$ and $\alpha_n''$ are coefficients independent of time. The reflection symmetry of the sense capacitor along the x-axis (as shown in FIGS. 4, 6, 8, 10, and 12) causes odd harmonics of the motor frequency to be zero, as well as requiring that the coefficients of $\sin(2n\omega t)$ are zero in the Fourier series of the sense capacitance.

Terms in equation (7) higher than n=1 do not have a significant effect on $y_S(t)$, so they may optionally be ignored. Inserting equation (7) into equation (6) gives equation (8):

$$\ddot{y}_S + \frac{\gamma}{m}\dot{y}_S + \left(\omega_S^2 - \frac{\alpha_1'' V^2}{m}\cos(2\omega t)\right) y_S = \frac{F}{m}, \quad (8)$$

where the electrostatically softened sense frequency $\omega_S$ is defined by equation (9) as:

$$\omega_S^2 \equiv \omega_{SM}^2 - \frac{(C''_{+1}(0,0) + \alpha''_0)V^2}{m}. \quad (9)$$

Equation (8) has the form of the well-known Mathieu equation. It shows that the sense resonant frequency is modulated at twice the motor frequency, due to the modulation of $C''_{+1}(x,0)$ by the motor motion of the proof masses. This modulation of the sense frequency produces parametric amplification in the embodiments.

The sense mode response $y_S(t)$ given by solving equation (8) is primarily at the motor frequency $\omega$, because the driving force F(t) is at frequency $\omega$, which is close to the sense resonant frequency $\omega_S$, where the mechanical response is large. Terms at other frequencies are far from the sense resonant frequency, so they do not produce a large contribution to $y_S(t)$. This is also the reason that equation (8) excludes terms in $C''_{+1}(x,0)$ with frequency higher than $2\omega$.

Assuming a solution to equation (8) is of the form of equation (10) below:

$$y_S(t) \equiv y_0 \cos(\omega t + \theta), \quad (10)$$

and neglecting the damping term, the solution can be written as equation (11) below:

$$y_0 = \frac{F}{m}\left[\frac{1}{\omega_S^2 - \omega^2 \mp \frac{\alpha_1'' V^2}{2m}}\right], \quad (11)$$

with the phase $\theta$ being equal to the phase $\psi$ of the force F(t). The sign in the denominator of equation (11) is negative for $\psi=0$ (Coriolis), and positive for $\psi=\pi/2$ (quadrature). Equation (11) shows that if the sign of $\alpha_1''$ is the same as the sign of $\omega_S^2-\omega^2$, then the amplitude of the response of $y_S(t)$ to a Coriolis-phase force ($\psi=0$) is increased by the capacitance modulation, and the response to a quadrature-phase force is decreased in amplitude.

An expression for the sensor electrical gain, the transfer function from proof mass sense-axis displacement to electrical output, is derived in this section. The non-linear mixing between the capacitance modulation and the sense mode displacements of the proof masses causes the electrical gain to be phase-dependent, so the electrical gain for the Coriolis-phase signal can be larger than that of the quadrature-phase signal.

The charges $q_+$ and $q_-$ on the sense capacitances are defined by equation (12) as:

$$q_\pm(t) = V_\pm [C_{\pm1}(x, y_1) + C_{\pm2}(x, y_2)], \quad (12)$$

where $V_\pm$ is the bias voltage on the positive or negative polarity sense capacitances, as defined in FIGS. 14a and 14c, or the bias voltage $V_{bias}$ applied to proof masses 1404, 1406 in FIG. 14b. Expanding the sense capacitances in Taylor series in $y_1$ and $y_2$, and assuming all four capacitances are identical when x, $y_1$, and $y_2$ are zero, equation (12) can be approximated for small $y_1$ and $y_2$ as defined by equation (13):

$$q_\pm(t) = 2V_\pm [C_{+1}(x,0) \pm C'_{+1}(x,0) y_S(t)]. \quad (13)$$

The capacitance $C_{+1}(x,0)$, and $C'_{+1}(x,0)$, its first derivative with respect to $y_1$, can be written as Fourier series in a manner similar to equation (7) for $C''_{+1}(x,0)$ as defined by equations (14) and (15) as:

$$C_{+1}(x(t), 0) = C_{+1}(0, 0) + \alpha_0 + \sum_{n=1}^{\infty} \alpha_n \cos(2n\omega t), \quad (14)$$

and $$C'_{+1}(x(t), 0) = C'_{+1}(0, 0) + \alpha'_0 + \sum_{n=1}^{\infty} \alpha'_n \cos(2n\omega t), \quad (15)$$

where $\alpha_0$, $\alpha_0'$, $\alpha_n$, and $\alpha_n'$ are coefficients independent of time. Inserting equations (14) and (15) into equation (13), and assuming the form for $y_S(t)$ given by equation (10), equation (16) below results:

$$q_\pm(t) = \qquad (16)$$
$$2V_\pm \Big[C_{+1}(0, 0) + \alpha_0 + \alpha_1\cos(2\omega t) \pm y_0[C'_{+1}(0, 0) + \alpha'_0]\cos(\omega t + \theta) \pm$$
$$\frac{y_0 \alpha'_1}{2}\cos(\omega t - \theta)\Big].$$

In equation (16), terms with frequency higher than $2\omega$ are neglected. The readout electronics of the MEMS gyroscope uses phase-sensitive detection to reject signals at frequencies other than the desired motor frequency $\omega$, so only the motor frequency component of the sensor output is of interest. Also, the first three terms on the right hand side of equation (16) do not contribute to the gyro output, because the configuration of bias voltages, combined with the choice of a single-ended or differential charge amplifier in the embodiments of FIGS. 14a, 14b, and 14c, is designed to null the contribution of these terms at the charge amplifier output.

Evaluating equation (16) for Coriolis-phase ($\theta=0$) and quadrature-phase ($\theta=\pi/2$) sense mode displacements, and ignoring the first three terms on the right hand side, the charges on the sense capacitances are defined by equations (17) and (18):

$$q_\pm(t) = \qquad (17)$$
$$\pm 2V_\pm y_0 \left[C'_{+1}(0, 0) + \alpha'_0 + \frac{\alpha'_1}{2}\right]\cos(\omega t) \; \text{Coriolis-phase} \; (\theta = 0),$$

and

-continued $$q_{\pm}(t) = \mp 2V_{\pm}y_0 \left[ C'_{+1}(0, 0) + \alpha'_0 - \frac{\alpha'_1}{2} \right] \sin(\omega t) \text{ Quadrature-phase } (\theta = \pi/2). \quad (18)$$

Equations (17) and (18) show that the amplitudes of the sense capacitance charges are dependent on the phase of the sense mode displacement $y_S(t)$. Thus, the electrical gain of the sensor is phase-dependent, so the electrical gain for a Coriolis-phase signal can be larger than that of a quadrature-phase signal.

An alternative to modulating the sense capacitance is to provide a set of auxiliary electrodes whose capacitance is modulated by the motor motion. If a DC bias voltage is applied to these auxiliary electrodes, and the second derivative of their capacitance with respect to sense axis displacement is modulated by motor motion, then these electrodes can modulate the sense frequency and produce parametric amplification. The parametric amplification is produced by modifying the mechanical gain of the sensor, as expressed by equation (11). The electrical gain of the sensor is not modified, since the electrical gain is determined by the sense electrodes. Thus, the use of auxiliary electrodes may provide greater flexibility in designing the mechanical and electrical gains of the sensor independently.

The above described embodiments of the comb finger pairs were described in the context of an out-of-plane MEMS gyroscope. Embodiments may also be implemented in an in-plane MEMS gyroscope, in a MEMS accelerometer, or other MEMS devices that employ comb pairs operated to generate a sensed capacitance. Furthermore, alternative embodiments of a MEMS capacitance modulation device 100 may have the sense electrodes, proof masses, and/or their respective comb fingers arranged differently, or may include more or less, than the exemplary embodiments described and/or illustrated herein.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for operating a Micro-Electro-Mechanical Systems (MEMS) gyroscope sensor, comprising:
    inducing a motor motion to a proof mass, the proof mass capacitively coupled to a sense electrode via a gap between mating comb fingers of at least one comb finger pair that define a sense capacitance between the proof mass and the electrode, the shape of the sense electrode such that motion along the motor axis produces a variation in sense capacitance whereby the capacitance is variable as a function of a displacement in a position of the mated comb fingers caused by the induced motor motion; and
    producing a time-varying electrical output in response to a rotation of the MEMS gyroscope, wherein the time-varying electrical output is amplified by the capacitance variation caused by the induced motor motion and the shape of the sense electrode.

2. The method of claim 1, wherein at least one of the mating comb fingers of the comb finger pair is defined by an end portion with a first width and an attaching portion with a second width less than the first width, wherein producing the time-varying electrical output comprises:
    increasing the gap as the function of the displacement along a direction of the motor motion such that the variable capacitive coupling decreases as the function of the displacement.

3. The method of claim 1, wherein at least one of the mating comb fingers of the comb finger pair is defined by an end portion with a first width and an attaching portion with a second width greater than the first width, wherein producing the time-varying electrical output comprises:
    decreasing the gap as the function of the displacement along a direction of the motor motion such that the variable capacitive coupling increases as the function of the displacement.

4. The method of claim 1, wherein at least one of the mating comb fingers of the comb finger pair is defined by a corrugated end portion, wherein producing the time-varying electrical output comprises:
    decreasing the gap as the function of the displacement along a direction of the motor motion such that the variable capacitive coupling increases as the function of the displacement.

5. The method of claim 1, wherein a first mating comb finger of a first electrode and a first mating comb finger of the proof mass are each tilted at a first shallow angle with respect to an x-axis of the motor motion, further comprising:
    increasing a first gap between the first mating comb finger of the first electrode and the first mating comb finger of the proof mass as the function of the displacement along a direction of the motor motion such that a first variable capacitive coupling decreases as the function of the displacement, and
wherein a second mating comb finger of a second electrode and a second mating comb finger of the proof mass are each tilted at a second shallow angle with respect to the x-axis of the motor motion, further comprising:
    decreasing a second gap between the second mating comb finger of the second electrode and the second mating comb finger of the proof mass as the function of the displacement along the direction of the motor motion such that a second variable capacitive coupling increases as the function of the displacement.

6. The method of claim 1, wherein inducing the motor motion to the proof mass comprises:
    inducing the motor motion at a predefined motor frequency;
    generating a time-dependent variable electrostatic force produced by the variable capacitive coupling (C); and
    modulating dC/dy at twice a motor frequency to cause a force FY to be modulated at twice the motor frequency, wherein the time-dependent variable electrostatic force along a y-axis is defined by:

$$F_y(t) = \frac{1}{2} \frac{\partial C(t)}{\partial y} V_{bias}^2,$$

and wherein y is the y-axis displacement corresponding to a direction perpendicular to a direction of the motor motion, wherein $V_{bias}$ is a direct current (DC) voltage, and wherein dC/dy is a derivative of C with respect to y.

7. The method of claim 6, wherein Fy(t) is a pump force operable to provide parametric amplification of a mechanical response of the proof mass to a Coriolis force.

8. The method of claim 6, wherein Fy(t) is a pump force operable to provide suppression of a response of the proof mass to a quadrature-phase force.

9. A Micro-Electro-Mechanical Systems (MEMS) sensor, comprising:
- a proof mass with at least one proof mass comb finger, the proof mass comb finger comprising:
  - a proof mass comb finger end portion; and
  - a proof mass comb finger attaching portion that couples the proof mass comb finger end portion to the proof mass;
- a sense electrode with at least one sense electrode comb finger separated from the proof mass comb finger by a gap, the gap defining a variable capacitive coupling between the proof mass comb finger and the sense electrode comb finger, the sense electrode comb finger comprising:
  - a sense electrode comb finger end portion; and
  - a sense electrode comb finger attaching portion that couples the sense electrode comb finger end portion to an anchor;
- an electrical output operable to output a time-varying electrical output, the time-varying electrical output being amplified by a variation of the variable capacitive coupling produced by an induced motor motion of the proof mass and the shape of the sense electrode, wherein the shape is such that the induced motor motion produces a variation in sense capacitance, whereby the variable output is amplified by the capacitance variation.

10. The MEMS sensor of claim 9, wherein at least one of the proof mass comb finger end portion and the sense electrode comb finger end portion is wider than its respective attaching portion such that the gap increases as a function of a displacement along a direction of the motor motion, wherein the variable capacitive coupling decreases as the gap increases.

11. The MEMS sensor of claim 9, wherein at least one of the proof mass comb finger end portion and the sense electrode comb finger end portion is narrower than its respective comb finger attaching portion such that the gap decreases as a function of a displacement along a direction of the motor motion, wherein the variable capacitive coupling increases as the gap decreases.

12. The MEMS sensor of claim 9, wherein at least one of the proof mass comb finger end portion and the sense electrode comb finger end portion is corrugated such that the variable capacitive coupling increases as a function of a displacement along a direction of the motor motion.

13. The MEMS sensor of claim 9, wherein at least one of the proof mass comb finger end portion and the sense electrode comb finger end portion is corrugated such that the variable capacitive coupling decreases as the function of the displacement along a direction of the motor motion.

14. The MEMS sensor of claim 9, further comprising:
- a first sense electrode comb finger tilted at a first angle with respect to an x-axis of the motor motion;
- a first proof mass comb finger tilted at the first angle;
- a second sense electrode comb finger tilted at a second angle with respect to the x-axis of the motor motion; and
- a second proof mass comb finger tilted at the second angle, wherein a first gap defined by the first sense electrode comb finger and the first proof mass comb finger increases as the function of the displacement along a direction of the motor motion such that a first variable capacitive coupling decreases as the function of the displacement, and wherein a second gap defined by the second sense electrode comb finger and the second proof mass comb finger decreases as the function of the displacement along the direction of the motor motion such that a second variable capacitive coupling increases as the function of the displacement.

15. The MEMS sensor of claim 9, further comprising:
- at least one motor operable to induce the motor motion of the proof mass.

16. The MEMS sensor of claim 9, further comprising an auxiliary electrode that produces parametric amplification when a sense electrode senses rotation.

17. A sensor, comprising:
- a proof mass with at least one proof mass comb finger, the proof mass comb finger comprising:
  - a proof mass comb finger end portion; and
  - a proof mass comb finger attaching portion that couples the proof mass comb finger end portion to the proof mass;
- a sense electrode with at least one electrode comb finger separated from the proof mass comb finger by a gap, the gap defining a variable capacitive coupling between the proof mass comb finger and the electrode comb finger, the electrode comb finger comprising:
  - an electrode comb finger end portion; and
  - an electrode comb finger attaching portion that couples the electrode comb finger end portion to an anchor;
- an electrical output operable to output a variable output in response to a variation of the variable capacitive coupling produced by an induced motor motion of the proof mass and the shape of the sense electrode, wherein the shape is such that the induced motor motion produces a variation in sense capacitance, whereby the variable output is amplified by the capacitance variation.

18. The sensor of claim 17, further comprising an auxiliary electrode that produces parametric amplification when a sense electrode senses rotation.

* * * * *